United States Patent
Liu et al.

(10) Patent No.: US 10,680,299 B2
(45) Date of Patent: Jun. 9, 2020

(54) BATTERY HEATING METHODS AND SYSTEMS

(71) Applicant: Jie Liu, Ottawa (CA)

(72) Inventors: Jie Liu, Ottawa (CA); Rui Zhao, Ottawa (CA); Long Zhai, Yongcheng (CN)

(73) Assignee: Jie Liu, Ottawa (CA)

( * ) Notice: Subject to any disclaimer, the term of this patent is extended or adjusted under 35 U.S.C. 154(b) by 183 days.

(21) Appl. No.: 15/941,905

(22) Filed: Mar. 30, 2018

(65) Prior Publication Data
US 2019/0252742 A1    Aug. 15, 2019

(30) Foreign Application Priority Data
Feb. 9, 2018    (CN) .......................... 2018 1 0133183

(51) Int. Cl.
*H01M 10/637*    (2014.01)
*H01M 10/0525*    (2010.01)
(Continued)

(52) U.S. Cl.
CPC ....... *H01M 10/637* (2015.04); *H01M 2/1016* (2013.01); *H01M 10/0525* (2013.01); *H01M 10/0585* (2013.01); *H01M 10/0587* (2013.01); *H01M 10/425* (2013.01); *H01M 10/486* (2013.01); *H01M 10/615* (2015.04); *H01M 10/654* (2015.04); *H01M 10/659* (2015.04); *H01M 10/6551* (2015.04); *H01M 10/6571* (2015.04); *H01M 2010/4278* (2013.01)

(58) Field of Classification Search
CPC .......... H01M 10/637; H01M 10/0587; H01M 10/0585; H01M 2/1016; H01M 10/659; H01M 10/6551; H01M 10/654; H01M 10/6571; H01M 10/486; H01M 10/425; H01M 10/615; H01M 10/0525; H01M 2010/4278; H01M 10/633
USPC ........................................................ 320/153
See application file for complete search history.

(56) References Cited

U.S. PATENT DOCUMENTS 4,371,910 A * 2/1983 Bube ........................ H02H 6/00
                                                  307/10.1
5,990,661 A * 11/1999 Ashtiani .............. H05B 1/0236
                                                  320/128

(Continued)

*Primary Examiner* — M Baye Diao
(74) *Attorney, Agent, or Firm* — Rosenberg, Klein & Lee (57) ABSTRACT

This patent provides a battery heating technique that preheats the battery from extreme cold condition (e.g., −30° C.) to an appropriate operating temperature. This technique belongs to the battery energy storage and application field. The battery heating system includes a simple external control circuit and a battery (or battery pack) for heating. During the heating stage, the external control circuit and battery (or battery pack) forms a close loop. A continuous and pulse current will flow through the battery and generate joule heat on the battery internal resistance to preheat the battery (or battery pack). The heating technique can be used on any types of batteries without changing their internal and external structures, and this technique is low cost and can preheats the battery (or battery pack) from −30° C. to 0° C. in one minute. By using the internal resistance as the heat source, the heating technique can heat the battery (or battery pack) uniformly and is of high efficiency.

17 Claims, 5 Drawing Sheets

(51) Int. Cl.
    *H01M 10/615*      (2014.01)
    *H01M 10/42*       (2006.01)
    *H01M 10/48*       (2006.01)
    *H01M 10/6571*     (2014.01)
    *H01M 10/654*      (2014.01)
    *H01M 10/6551*     (2014.01)
    *H01M 10/659*      (2014.01)
    *H01M 2/10*        (2006.01)
    *H01M 10/0585*     (2010.01)
    *H01M 10/0587*     (2010.01)

(56) References Cited

U.S. PATENT DOCUMENTS

| | | | |
|---|---|---|---|
| 7,959,860 B2 * | 6/2011 | Faries, Jr. | A61F 7/0085 |
| | | | 128/849 |
| 2010/0139627 A1 * | 6/2010 | Verhein | F02D 19/0605 |
| | | | 123/553 |
| 2018/0099346 A1 * | 4/2018 | Zwayer | B23K 9/1093 |

* cited by examiner

BATTERY HEATING METHODS AND SYSTEMS

CROSS-REFERENCE TO RELATED APPLICATIONS

This patent application claims the benefit of priority from Chinese Patent Application CN 201810133183.2 filed Feb. 9, 2018 entitled "Pure Internal Resistance Battery Heating System", the entire contents of which are included herein by reference.

FIELD OF THE INVENTION CROSS

This patent application relates to batteries and more particularly to methods and systems for preheating a battery under cold conditions and preheating standard batteries without requiring any modification to existing battery geometries.

BACKGROUND OF THE INVENTION

Secondary batteries, especially lithium-ion (Li-ion) batteries, are extensively used in daily life. Due to their high energy density, specific energy, and low capacity fading rate, Li-ion batteries have become an indispensable component for the electric vehicle (EV) and hybrid electric vehicle (HEV) market. Nevertheless, Li-ion batteries are very sensitive to their working temperature. An extremely low temperature can substantially reduce the accessible energy that can be discharged from the batteries, and it can also trigger the process of lithium plating on the battery anodes during the charge sequence, which accelerates the capacity fading process and may engender safety issues such as internal short circuit. At a low temperature, the functionality of Li-ion battery powered devices is therefore negatively affected. For example, the range of an EV will be shortened, and the energy recovery is usually turned off; the cellphone can be automatically turned off; and the flash cannot be used on a digital camera. Consequently, a fast preheating technology is essential to the proper operation of a Li-ion battery energy storage system.

A qualified Li-ion battery preheating system should be able to detect the battery (or battery pack) temperature and preheat the battery (or battery pack) when the temperature is below the setting value, and it should ensure every battery in the battery pack is heated evenly with the maximum temperature difference within 5° C., thus extending the lifespan of the battery (battery pack). In addition, a preheating system that rapidly warm up the battery (or battery pack) with a high efficiency will further promote the application and development of the Li-ion battery powered devices in cold regions and countries.

To date, there are four main battery preheating systems: forced convection heating system, alternating current (AC) heating system, exterior resistor heating system, and built-in resistor heating system. Considering these individually, then forced convection and exterior resistor heating systems heat the battery from the surface, which takes a longer time for heating when the battery is thick. Comparatively, the AC and built-in resistor heating systems warm the battery internally. The AC heating system charge and discharge the battery (or battery pack) at high frequency to generate Joule heat to warm up the battery (or battery pack). However, it takes relatively longer time and results in the battery capacity fading over long-term usage. In recent years, a design that assembles heating resistor inside Li-ion battery has been invented, which could elevate the battery temperature from −30° C. to 0° C. in one minute. This design is very effective and efficient, but it requires that the design of the Li-ion battery be changed and is only applicable to pouch and prismatic Li-ion batteries and does not include cylindrical Li-ion batteries which have higher energy density storage. Further, battery design must factor this additional internal component into the design process.

Accordingly, it would be beneficial to provide designers of Li-ion battery devices with a method of rapidly and efficiently preheating the Li-ion battery without requiring that they limit themselves to specific Li-ion battery designs and manufacturers etc. Accordingly, a battery preheating method and system compatible with any Li-ion battery would be advantageous.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to batteries and more particularly to methods and systems for preheating a battery under cold conditions and preheating standard batteries without modification to existing battery geometries.

In accordance with an embodiment of the invention there is provided a system comprising:
providing a battery;
providing a preheating circuit for preheating the battery comprising a current sensor in series with an electrical switch connected in series with the battery and a temperature sensor in thermal contact with the battery; and
providing a controller or control circuit coupled to the current sensor, temperature sensor, and electrical switch; wherein
in a first configuration where the temperature of the battery is above a predetermined temperature the electrical switch is open and the battery can discharge to an external circuit;
in a second configuration where the temperature of the battery is below the predetermined temperature the electrical switch is closed such that the battery is short circuited and heated via through joule heating through its internal resistance and if the current flowing is below a predetermined maximum current the electrical switch is kept closed; and
in a third configuration where the temperature of the battery is below the predetermined temperature but closing the electrical switch such that the battery is short circuited and heated via joule heating through its internal resistance results in the current flowing being above the predetermined maximum current the electrical switch is modulated to keep the current flowing below the predetermined maximum current.

In accordance with an embodiment of the invention there is provided a method comprising:
providing a battery;
providing a preheating circuit for preheating the battery comprising a current sensor in series with an electrical switch connected in series with the battery and a temperature sensor in thermal contact with the battery; and
providing a controller or control circuit coupled to the current sensor, temperature sensor, and electrical switch; wherein in a first configuration where the temperature of the battery is above a predetermined temperature the electrical switch is open and the battery can discharge to an external circuit;

in a second configuration where the temperature of the battery is below the predetermined temperature the electrical switch is closed such that the battery is short circuited and heated via through joule heating through its internal resistance and if the current flowing is below a predetermined maximum current the electrical switch is kept closed; and in a third configuration where the temperature of the battery is below the predetermined temperature but closing the electrical switch such that the battery is short circuited and heated via joule heating through its internal resistance results in the current flowing being above the predetermined maximum current the electrical switch is modulated to keep the current flowing below the predetermined maximum current.

In accordance with an embodiment of the invention there is provided a non-volatile non-transitory computer readable medium storing computer executable instructions for execution by a microprocessor, the instruction relating to a process comprising the steps of:

determining whether the temperature of a battery is above a predetermined setpoint temperature;

upon a positive determination with respect to the temperature opening an electrical switch forming part of an electrical circuit together with a current sensor disposed in series with the battery;

upon a negative determination with respect to the temperature closing the electrical switch such that the battery is short circuited via the external electrical circuit and heats via through joule heating through its internal resistance;

determining if the current flowing in the electrical circuit when the electrical switch is closed is below a predetermined maximum current;

upon a positive determination with respect to the current maintaining the electrical switch closed; and upon a negative determination with respect to the current modulating the electrical switch to keep the current flowing below the predetermined maximum current.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present description is directed to batteries and more particularly to methods and systems for preheating a battery under cold conditions and preheating standard batteries without modification to existing battery geometries.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "rechargeable battery" also known as a storage battery, secondary cell, or accumulator is a type of electrical battery which can be charged, discharged into a load, and recharged many times, as opposed to a disposable or primary battery, which is supplied fully charged and discarded after use. It is composed of one or more electrochemical cells. The term "accumulator" is used as it accumulates and stores energy through a reversible electrochemical reaction. Rechargeable batteries are produced in many different shapes and sizes, ranging from button cells to megawatt systems connected to stabilize an electrical distribution network. Several different combinations of electrode materials and electrolytes are used, including lead-acid, nickel-cadmium (NiCd), nickel-metal hydride (NiMH), lithium-ion (Li-ion), aluminum ion (Al-ion), and lithium-ion polymer (Li-ion polymer).

A lithium-ion battery or "Li-ion" battery (often abbreviated to LIB) as used herein and throughout this disclosure, refers to a type of rechargeable battery in which lithium ions move from the negative electrode to the positive electrode during discharge and back when charging. Li-ion batteries use an intercalated lithium compound as one electrode material, compared to the metallic lithium used in a non-rechargeable lithium battery. The electrolyte, which allows for ionic movement, and the two electrodes are the constituent components of a lithium-ion battery cell. Chemistry, performance, cost and safety characteristics vary across LIB types. Handheld electronics mostly use LIBs based on lithium cobalt oxide ($LiCoO_2$), which offers high energy density, but presents safety risks, especially when damaged. Lithium iron phosphate ($LiFePO_4$), lithium ion manganese oxide battery ($LiMn_2O_4$, $Li_2MnO_3$, or LMO) and lithium nickel manganese cobalt oxide ($LiNiMnCoO_2$ or NMC) offer lower energy density, but longer lives and less likelihood of unfortunate events in real world use, (e.g., fire or explosion). Such batteries are widely used for electric tools, medical equipment, and other roles. NMC in particular is a leading contender for automotive applications whilst lithium nickel cobalt aluminum oxide ($LiNiCoAlO_2$ or NCA) and lithium titanate ($Li_4Ti_5O_{12}$ or LTO) are typically considered specialty designs aimed at particular niche roles. Newer lithium-sulfur battery designs offer promise of higher performance-to-weight ratio albeit with lower voltage at 2.0V. Most rechargeable cylindrical cells use a chemistry with a nominal voltage around 3.7 volts, but $LiFePO_4$ cells produce only 3.2 volts.

An "18650" or "18650 type" battery as used herein and throughout this disclosure, refers to a Li-ion battery providing a typical capacity between 1500-3600 mAh and having dimensions of maximum diameter 18.6 mm (0.75 inches) and length 65.2 mm (2.6 inches). Such 18650 type Li-ion batteries being used in many laptop computer batteries, LED flashlights, electronic cigarettes, cordless power tools and Tesla EVs such as the Tesla Roadster, Tesla Model S, and Tesla Model X. 18650 type batteries may also be referred to as 168A type batteries.

A "current sensor" as used herein and throughout this disclosure, refers is a device that detects electric current in a conductor, e.g. a wire, and generates a signal proportional to that current. The generated signal could be analog voltage or current or even a digital output and can be then used to display the measured current, stored for further analysis in a data acquisition system, or can be used for the purpose of control. Examples of current sensors compatible with direct current (DC) measurements include, but are not limited to, Hall effect sensors, resistors, and fluxgate transformers. Examples of current sensors compatible with alternating current (AC) measurements include, but are not limited to, Hall effect sensors, transformers, fluxgate transformers, resistors, and Rogowski coils. A Rogowski coil is usually connected to an electrical (or electronic) integrator circuit to provide an output signal that is proportional to the current and hence often coupled to single-chip signal processors with built-in analog to digital converters etc.

An "electrical switch" as used herein and throughout this disclosure, refers is electrical component that can "make" or "break" an electrical circuit, interrupting the current or diverting it from one conductor to another. Examples of electrical switches with electrical control as opposed to others such as thermally activated, mechanically activated, optically activated etc. include relays, solid state relays, transistors, metal-oxide-semiconductor field-effect transistor (MOSFET), power transistor, etc. according to the voltage and current requirements the electrical switch must handle together with switching speed, switching frequency etc.

Embodiments of the invention are described and depicted with respect to a 18650-type Li-ion rechargeable battery. However, embodiments of the invention may be exploited with other Li-ion rechargeable batteries including, but not limited to, 10180, 10280, 10440, 14250, 14430, 14500, 14650, 15270, 16340, 16650, RCR 123A, 17500, 17670, 18350, 18490, 18500, 20700, 21700, 25500, 26650, 32600, 32650, and 75400. It would also be evident that embodiments of the invention may be exploited with battery packs and/or power packs that combine multiple Li-ion rechargeable batteries into a single housing such as employed, for example, in the removable battery of a laptop computer, battery pack for portable power tools, within an EV etc.

Further, whilst embodiments of the invention are described and depicted with respect to Li-ion rechargeable batteries the methods and systems presented would be compatible with other secondary rechargeable battery technologies. For example, the embodiments of the invention are compatible with Li-ion battery technology, Li-ion polymer battery technology, Al-ion battery technology, Ni-MH battery technology, and Ni—Cd battery technology.

Figure 1A:
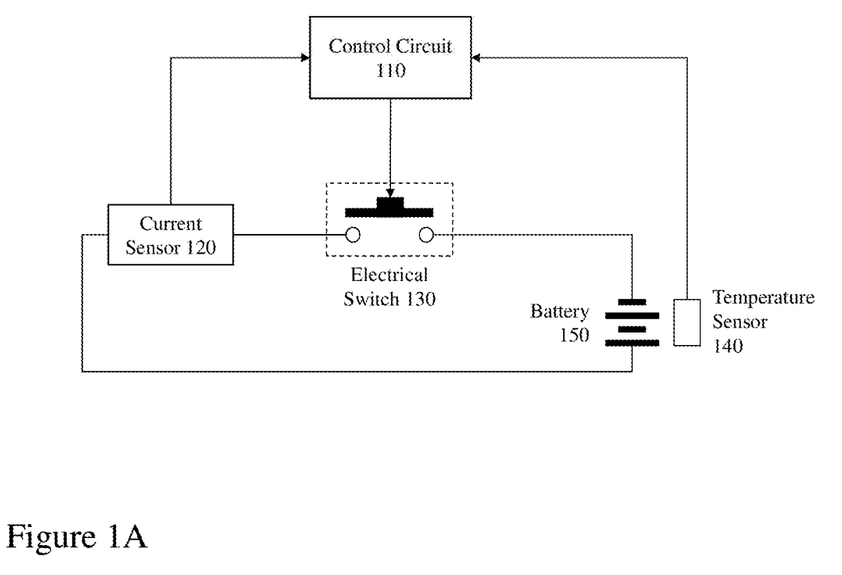
FIG. 1A depicts a simplified schematic circuit diagram of a battery heating system according to an embodiment of the invention.

Embodiments of the invention exploit controlled connection of the positive and negative contacts (tabs) of a Li-ion battery (or battery pack) via an external control circuit which heats the battery (or battery pack) by generating continuous and pulse current on the internal resistance of the battery (or battery pack). As depicted in FIG. 1A a schematic of an embodiment of the invention is depicted comprising the battery 150, a temperature sensor coupled to the battery 150 together with a current sensor 120 and electrical switch 130 disposed in an electrical circuit between the positive tab and negative tab. The current sensor 120, electrical switch 130, and temperature sensor 140 being coupled to a control circuit 110. The control circuit may be a microprocessor based control circuit, an application specific integrated circuit (ASIC), field programmable gate array (FPGA), microcontroller etc. as is appropriate.

During the heating stage, the external control circuit establishes a closed loop with the battery (or battery pack) via the current sensor 120 and electrical switch 130. Due to the substantially increased internal resistance of the battery (or battery pack) at low temperature, the loop current at the initial stage will be at a low level and within the safe range. The joule heat generated during this stage heats the battery, at a high rate. As the battery (or battery pack) temperature rises, the internal resistance of the battery (or battery pack) will gradually drop and the loop current will exceed the safe maximum discharge current. At this stage, the external control circuit will open and close the electrical switch 130 in pulsed manner to ensure the loop current is within the safe maximum discharge current, thus heating the battery (or battery pack) as quickly as possible.

Accordingly, embodiments of the invention exploit a novel technique to preheat the secondary battery, batteries, battery pack, or battery packs using joule heat generated through current flowing through the internal resistance of the battery (or battery pack). Accordingly, within the internal resistance heating system depicted in FIG. 1A the system utilizes the external control circuit to close and open the loop formed with the battery (or battery pack) to generate continuous and pulse currents and produce joule heat on battery's internal resistance and preheats the battery (or battery pack). Accordingly, the external control circuit closes the loop when the detected temperature signal is below a predetermined set temperature, e.g. 0° C., 10° C., etc. and the external control circuit compares the closed loop current with the maximum predetermined current set in order to dynamically turn the electrical switch on/off thereby producing intermittent close loop current to continue the heating process without exceeding the maximum safe current for the battery.

Figure 1B:
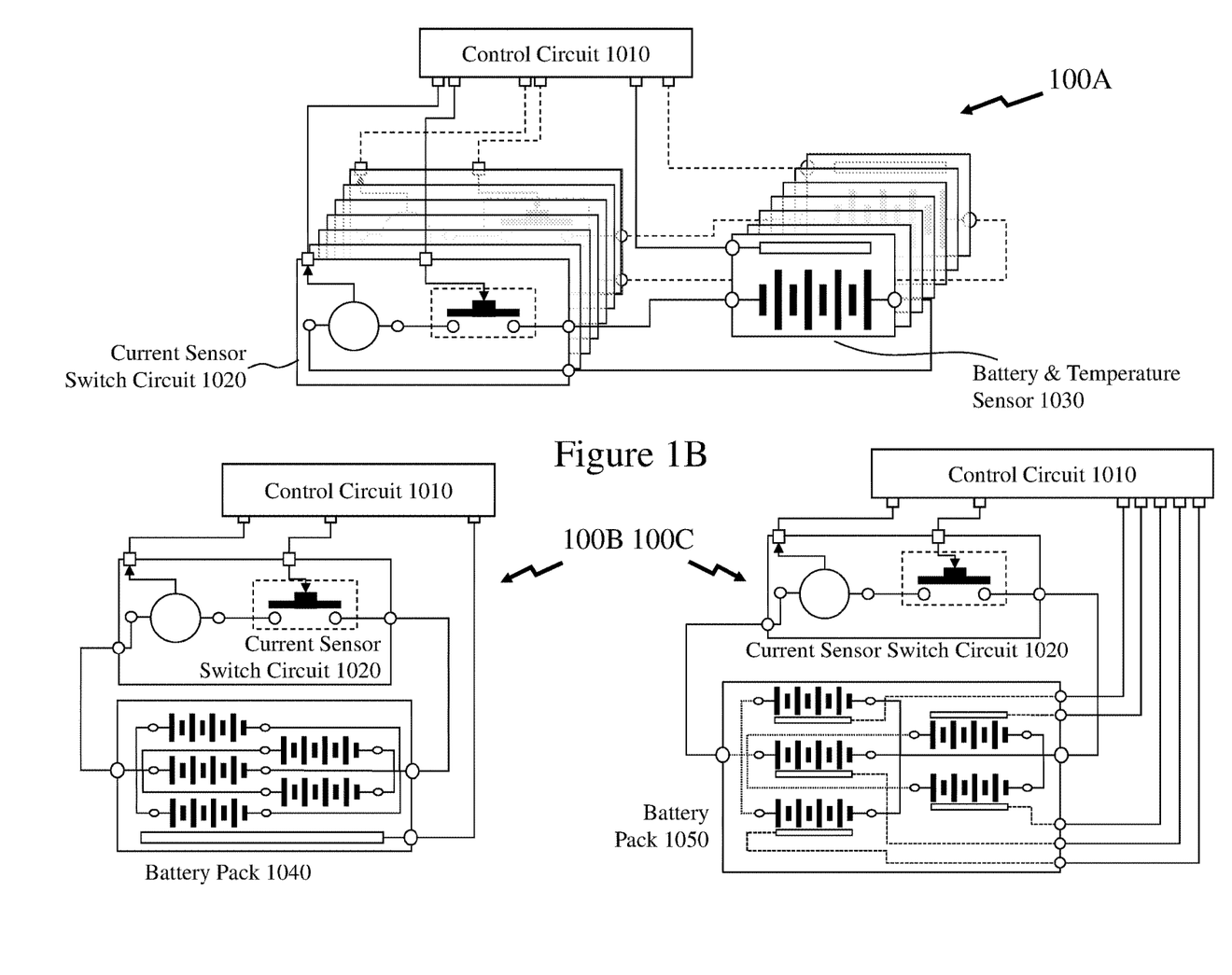
FIG. 1B depicts simplified schematic circuit diagrams for a battery heating system according to an embodiment of the invention addressing multiple batteries or battery packs comprising multiple batteries.

Accordingly, a battery may be heated through embodiment of the invention such as described in respect of FIG. 1A. It would be evident that alternate combinations of these elements may be employed when considering multiple batteries and battery packs comprising multiple batteries where these are within a single electronic system. Accordingly, referring to FIG. 1B first image 100A depicts multiple batteries each with an associated temperature sensor (battery and temperature sensor 1030) coupled to multiple current sensor switch circuits 1020 and a single control circuit 1010. Accordingly, each current sensor switch circuit 1020 may be controlled independently such that different battery characteristics can be accommodated such as maximum safe current etc. Alternatively, in many applications the multiple batteries are contained and combined within a module such as a laptop battery, for example, and accordingly in second image 100B a single current sensor and control circuit 1020 us employed in conjunction with the control circuit and the battery pack 1040 which contains a single temperature sensor. Accordingly, it is presumed good thermal contact exists between all batteries within the battery pack 1040 and the temperature sensor. In contrast third image 100C depicts a battery pack 1050 with multiple temperature sensors, each associated with a battery within the battery pack 1050, wherein the multiple temperature sensors are coupled to the control circuit 1010 and the battery pack 1050 is also coupled to a single current sensor switch circuit. Accordingly, it would be evident that these alternate arrangements and others as would be evident to one of skill in the art may be provided as part of an electronic device wherein the electronic device is then "populated" with the rechargeable batteries by the original equipment manufacturer or consumer, for example.

Figure 2:
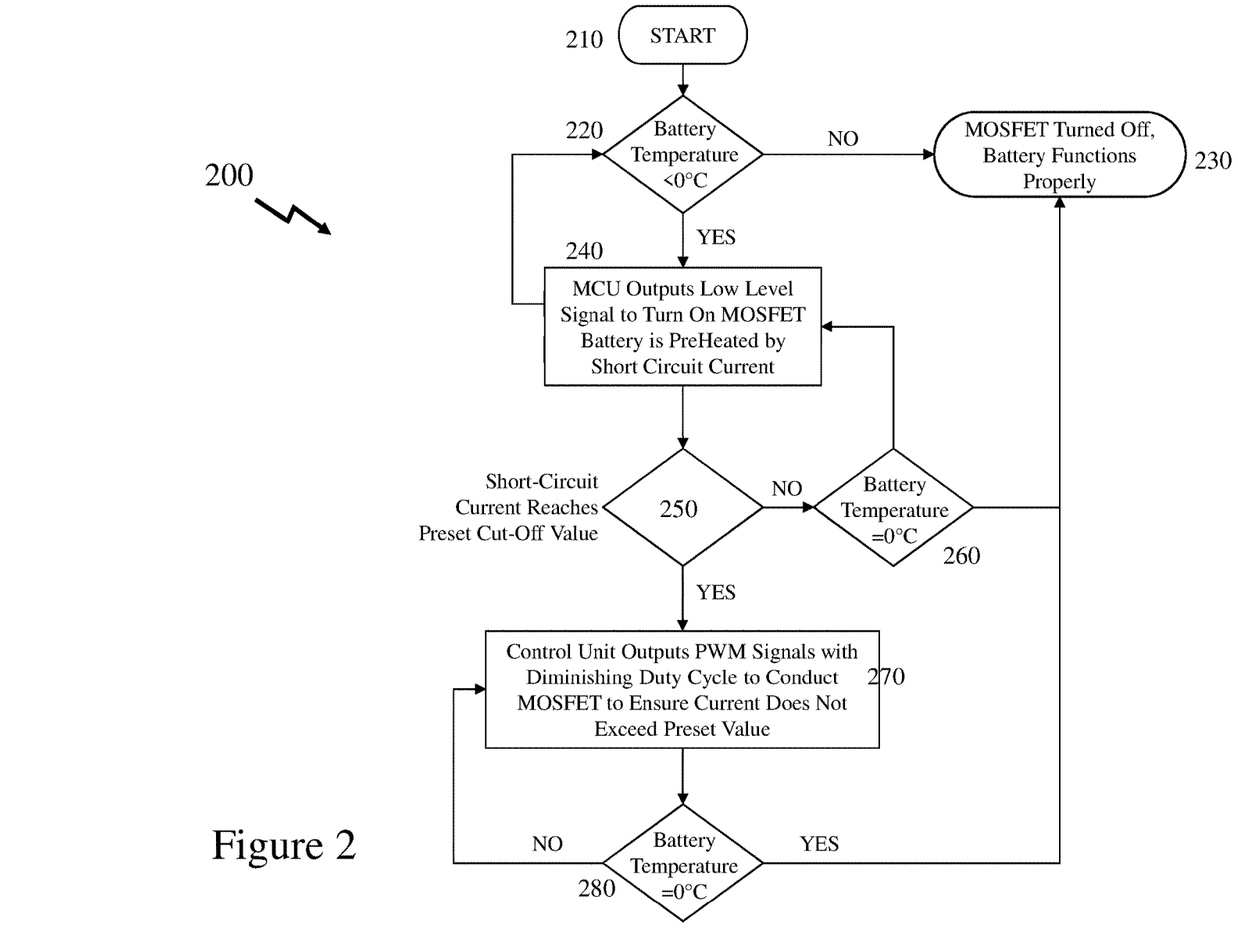
FIG. 2 depicts an exemplary process flow for a battery heating system according to an embodiment of the invention.

Now referring to FIG. 2 there is depicted an exemplary process flow 200 for a battery preheating system such as described and depicted in FIG. 1A. It would be evident to one of skill in the art that the control circuit may be varied to accommodate alternate constructions such as those depicted within FIG. 1B. As depicted the process flow 200 comprises steps 210 to 280 respectively wherein these comprise:

First step 210 wherein the process initiates;

Second step 220 wherein via signal acquisition by the control circuit the temperature sensor is read to establish the temperature of the battery (or battery pack). This received signal is then processed to determine whether the current battery temperature is above or below a predetermined setpoint temperature, e.g. 0° C. as depicted or another value, wherein preheating of the battery (or battery pack) has been deemed appropriate. Based upon this decision the process proceeds to either third step 230 when the temperature is above the predetermined setpoint temperature and fourth step 240 when the temperature is below the predetermined setpoint temperature.

Third step 230 wherein the determination has been made that the temperature is above the predetermined setpoint temperature and accordingly the electrical switch, e.g. a MOSFET, is turned off opening the closed loop and the battery operates normally.

Fourth step 240 wherein the determination has been made that the temperature is below the predetermined setpoint temperature and accordingly the electrical switch, e.g. a MOSFET, is turned on closing the closed loop such that the current flows through the closed loop which is "short circuiting" and through the internal resistance of the battery (or battery pack) raising the temperature of the battery (or battery pack).

Fifth step 250 wherein the current sensor is read and a determination is made as to whether a predetermined maximum current has been exceeded. If not, the process proceeds to sixth step 260 to determine whether the battery temperature has reach the predetermined setpoint temperature. If the predetermined maximum current has been exceeded the process proceeds to seventh step 270.

Sixth step 260 wherein the temperature sensor is read to determine whether the current battery temperature is above or below a predetermined setpoint temperature, e.g. 0° C. as depicted or another value, wherein preheating of the battery (or battery pack) has been deemed appropriate. Based upon this decision the process proceeds to third step 230 when the temperature is above the predetermined setpoint temperature or loops back to fourth step 240 when the temperature is below the predetermined setpoint temperature.

Seventh step 270 wherein if the predetermined maximum current limit has been reached and the battery is not at or above the predetermined setpoint temperature then the control unit outputs pulse width modulated (PWM) control signals of diminishing duty cycle to conduct the electrical switch between on and off states in order to ensure the current does not exceed the predetermined maximum current limit and proceeds to step 280.

Eighth step 280 wherein the temperature sensor is read to determine whether the current battery temperature is above or below a predetermined setpoint temperature, e.g. 0° C. as depicted or another value, wherein preheating of the battery (or battery pack) has been deemed appropriate. Based upon this decision the process proceeds to third step 230 when the temperature is above the predetermined setpoint temperature or loops back to fourth step 270 when the temperature is below the predetermined setpoint temperature as the predetermined maximum current limit has been reached previously.

Accordingly, the control circuit monitors the current and temperature sensors to determine how to control the MOS- FET. The control circuit will turn off the direct closed loop (short circuit) once the loop current exceeds a set limit or the predetermined setpoint temperature has been reached. If the temperature has not been reached the control circuit modulate the switch via PWM to ensure the heating current is below the limit. Optionally, the control circuit may enable another electrical switch (e.g. another MOSFET) when the temperature is above the predetermined temperature so that the electrical device can draw power.

The diminishing duty cycle of the PWM signal controlling the electrical switch may reduce in a predetermined manner established in dependence upon the specific battery or battery pack being heated.

The diminishing duty cycle of the PWM signal controlling the electrical switch may reduce in a predetermined manner established in dependence upon the temperature of the battery or battery pack.

The inventive heating system has the following advantages:
- any commercial Li-ion batteries can be used with this technique for heating purpose. No internal and external structure modifications are required;
- the heating of the battery (or battery pack) is achieved with a simple and cost-effective external control circuit;
- the heating technique can provide fast heating for Li-ion batteries;
- the battery (or battery pack) is self-heated using its pure internal resistance, which makes the battery (or battery pack) can be heated evenly, thus minimizing the temperature difference in a single battery and a battery pack; and
- as the heat is generated within the battery (or battery pack) itself, the heating efficiency of this heating technique can reach above 95%.

At a low temperature, usually below −10° C., the diffusion and intercalation processes of the lithium ions become difficult, which will lead to the significant rise of the internal resistance of Li-ion batteries. This feature facilitates the pure internal resistance heating, making the close loop current at a low level and easy to control.

When the external control circuit is on, the temperature sensor will automatically detect the battery temperature. The control circuit will close the electrical switch to enable the heating if the detect temperature is lower than the set temperature. The continuous and pulse current generated in the loop act on the internal resistance of the battery (or battery pack) to produce joule heat. This joule heat is used in this technique to warm up the battery and is extracted from the battery (or battery pack) itself. There is no heating component in the external circuit, which is only used for battery heating control.

The battery internal resistance drops as the battery temperature increases leading to a quick rise of the close loop current. To avoid the impact of large close loop current on the Li-ion battery (or battery pack), the current sensor of the external control circuit will detect the close loop current and compare it with the safe maximum discharge current. If the detected current is higher, the electrical switch (e.g., MOSEFET) of the external control circuit will be turned off to avoid the further increase of the close loop current, and the control circuit will be switched to a pulse current control mode to manage the close loop current within the safe range. In this invention, the safe maximum current is dependent on the battery type, materials, manufacturing process, and the craftsmanship, and is generally provided by the battery manufacturer. For safety consideration, a safety factor maybe be applied to ensure a suitable close loop current.

In general, the battery temperature is still at low level after the first cut-off of the switch. The external control circuit will output the pulse width modulation signal and works together with the current sensor and the switch to open and close the loop at high frequency to maintain the loop current below the safe maximum current and to achieve the fastest heating.

Finally, once the battery temperature detected by the temperature sensor reaches the set value, the switch will be turned off, and the battery (or battery pack) will operate normally.

To validate the effect of preheating of the pure internal resistance heating technique, tests were carried out on a standard commercial 18650 type Li-ion battery. Prior to the test, the battery was placed in a battery tray with having the positive and negative tabs connected with the external control circuit. The battery with the tray was then placed inside an environment chamber with a temperature of −30° C. to simulate extremely cold weather. The battery was kept in the environment chamber for 12 hours to ensure the entire battery reached −30° C.

Figure 3:
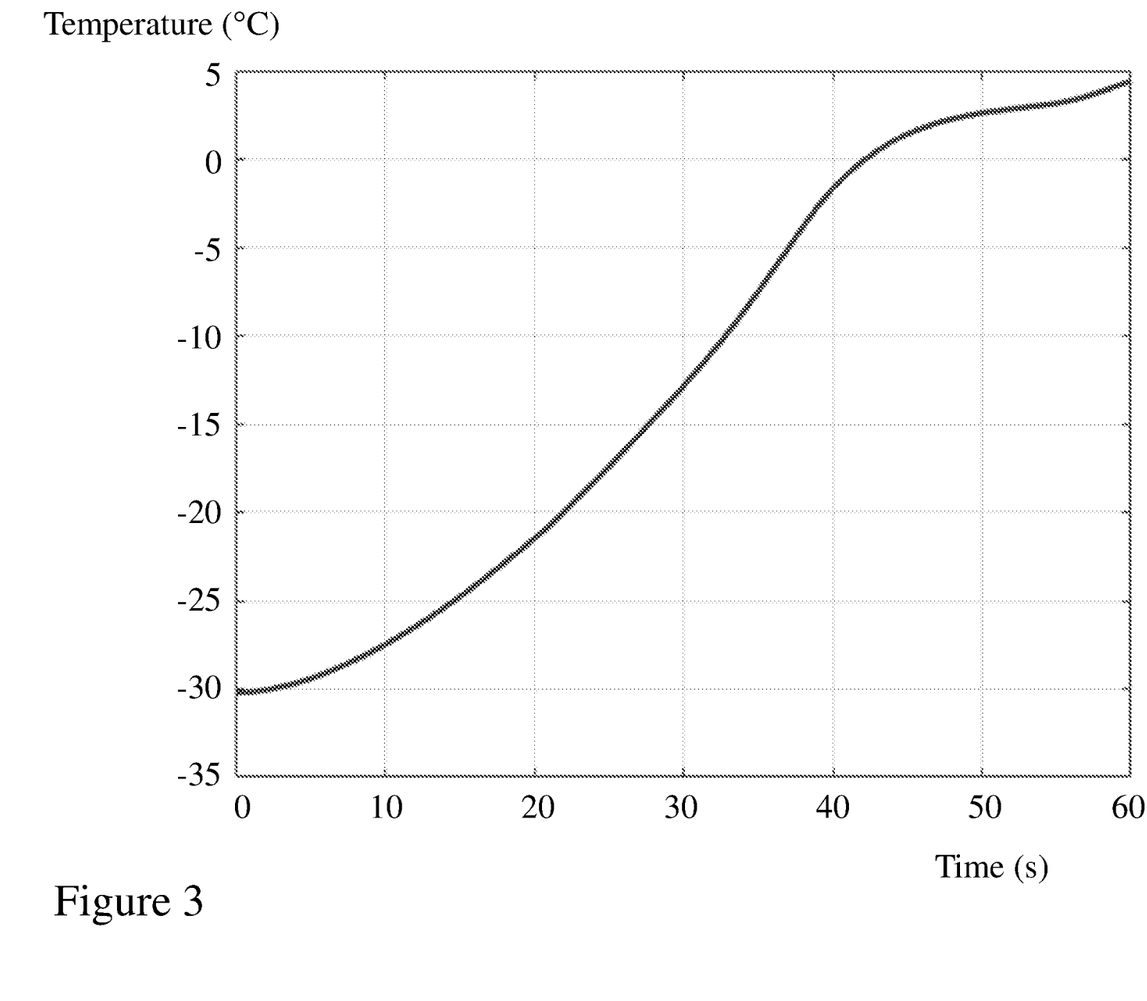
FIG. 3 depicts the temperature profile of a standard 18650 type Li-ion battery exploiting a battery preheating system according to an embodiment of the invention with an initial battery temperature of −30° C. indicating achievement of an internal temperature of 0° C. within approximately 45 seconds.

During the test, the external control circuit board was powered by a power supply. The temperature sensor of the external control circuit will first detect the battery temperature and compare it with the set value, if the detected value is lower, the switch on the control circuit board will be closed, and the current sensor will measure the loop current at high frequency to control the open and close of the loop. The battery preheating curve is shown in FIG. 3. As can be seen, the battery temperature reached 0° C. after 42 seconds. The heating time has a significant improvement when compared to the current available heating methods. Additionally, the pure internal resistance heating technique can be applied on any types of Li-ion batteries without modifying the internal and external structure, making it the best heating choice for Li-ion batteries used in cold areas.

The control circuit, electrical switch, and current sensor are all low current devices such that even at low temperatures a Li-ion battery or other battery can provide the necessary current to operate the control circuit. This is in contrast to the typical requirement for high current draw from a battery or battery pack when an electronic device is powered on. This battery may itself be a rechargeable battery and charged during operation of the electronic device the battery (or battery pack) is installed in or a primary battery.

Figure 4:
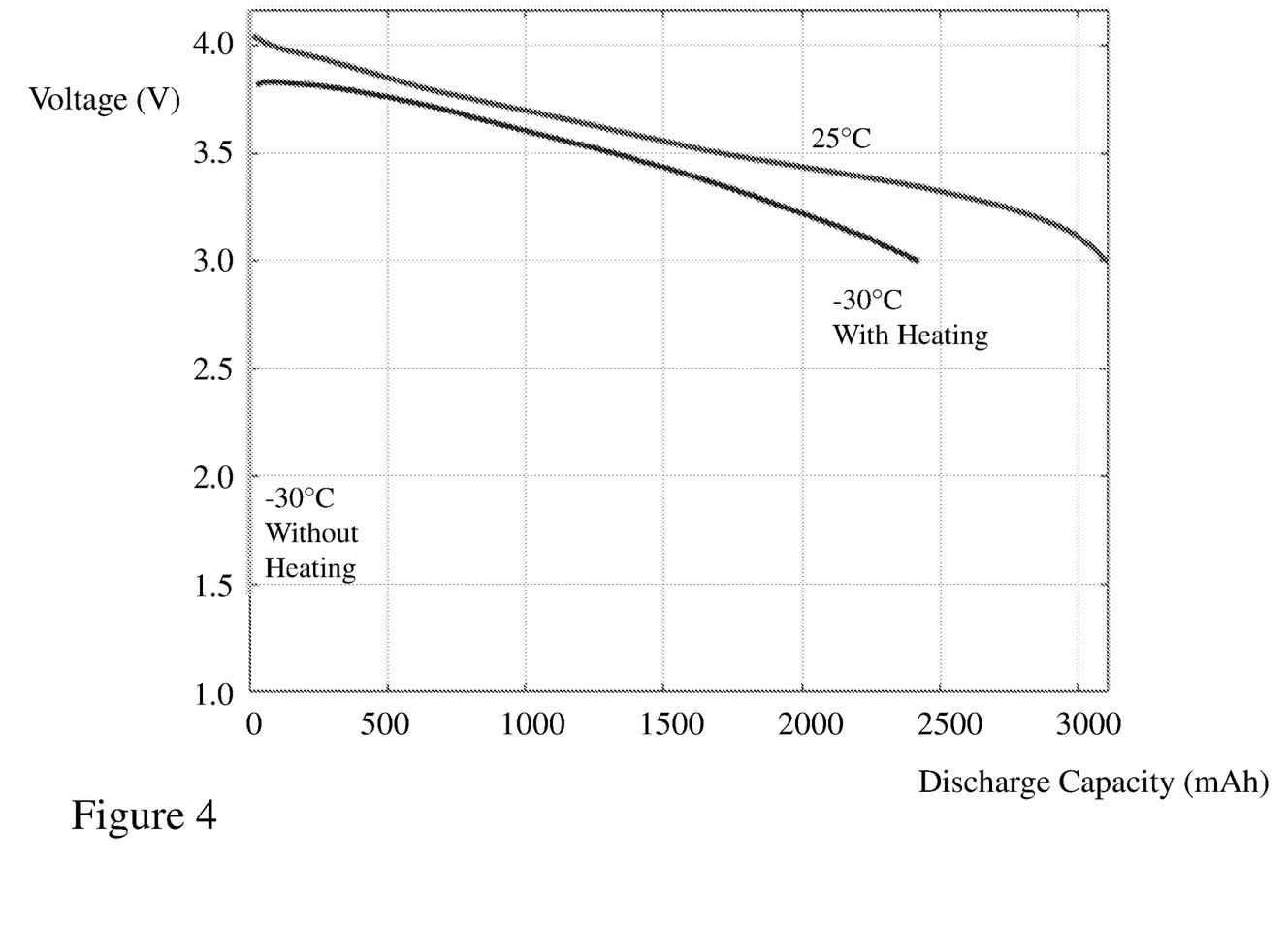
FIG. 4 depicts the discharge curves for 18650 type Li-ion batteries at room temperature (25° C.), at −30° C. without pre-heating, and at −30° C. with a battery preheating system according to an embodiment of the invention.

In FIG. 4, the discharging capability of the 18650 type Li-ion battery under different working environments are compared. At room temperature (25° C. in the test), the discharging process is smooth under a discharge current of 3 A, and the battery can discharge at a capacity of 3.1 Ah. For comparison, we also discharged the battery with an initial temperature of −30° C. It is seen in FIG. 4, due to the significant increase of the internal resistance, the battery voltage dramatically dropped to 0 V, without any capacity discharged. However, with installed the external control circuit and preheated to 0° C., the battery was able to discharge most of its capacity, thus ensuring proper operation of the Li-ion battery powered devices.

Whilst embodiments of the invention have been described with respect to providing a preheating circuit for commercial Li-ion batteries and other rechargeable batteries without any modification to the battery it would be evident that within other embodiments of the invention the battery may incorporate the temperature sensor.

Whilst embodiments of the invention have been described with respect to providing a preheating circuit for commercial Li-ion batteries and other rechargeable batteries without any modification to the battery it would be evident that within other embodiments of the invention the battery may incorporate one or more of the temperature sensor, the electrical switch, and the current sensor wherein additional contacts on the battery couple the one or more of the temperature sensor, the electrical switch, and the current sensor to the control circuit.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system comprising:
a battery;
a preheating circuit for preheating the battery comprising a current sensor in series with an electrical switch connected in series with the battery and a temperature sensor in thermal contact with the battery; and
a controller or control circuit coupled to the current sensor, temperature sensor, and electrical switch; wherein
in a first configuration where the temperature of the battery is above a predetermined temperature the electrical switch is open and the battery can discharge to an external circuit;
in a second configuration where the temperature of the battery is below the predetermined temperature the electrical switch is closed such that the battery is short circuited and heated via through joule heating through its internal resistance and if the current flowing is below a predetermined maximum current the electrical switch is kept closed; and
in a third configuration where the temperature of the battery is below the predetermined temperature but closing the electrical switch such that the battery is short circuited and heated via joule heating through its internal resistance results in the current flowing being above the predetermined maximum current the electrical switch is modulated to keep the current flowing below the predetermined maximum current.

2. The system according to claim 1, wherein
the battery is a secondary rechargeable battery.

3. The system according to claim 2, wherein
the secondary battery rechargeable battery is one of a lithium ion (Li-ion) battery, a Li-ion polymer battery, an aluminum ion (Al-ion) battery, a nickel-cadmium (NiCd) battery and a nickel-metal hydride (NiMH) battery.

4. The system according to claim 1, wherein
the battery is an assembly of secondary rechargeable batteries.

5. The system according to claim 4, wherein
each secondary battery rechargeable battery is at least one of a lithium ion (Li-ion) battery, a Li-ion polymer battery, an aluminum ion (Al-ion) battery, a nickel-cadmium (NiCd) battery and a nickel-metal hydride (NIMH) battery.

6. The system according to claim 1, further comprising
a second electrical switch coupled to the battery, an electrical device powered by the battery, and the controller or control circuit; wherein
an electrical circuit is the electrical device;
in the first configuration where the temperature of the battery is above the predetermined temperature the second electrical switch is closed such that electrical device can draw current from the battery; and
in either of the second configuration and third configuration the second electrical switch is open.

7. The system according to claim 1, wherein
the electrical switch is a MOSFET.

8. A method comprising:
providing a battery;
providing a preheating circuit for preheating the battery comprising a current sensor in series with an electrical switch connected in series with the battery and a temperature sensor in thermal contact with the battery; and
providing a controller or control circuit coupled to the current sensor, temperature sensor, and electrical switch; wherein
in a first configuration where the temperature of the battery is above a predetermined temperature the electrical switch is open and the battery can discharge to an external circuit;
in a second configuration where the temperature of the battery is below the predetermined temperature the electrical switch is closed such that the battery is short circuited and heated via through joule heating through its internal resistance and if the current flowing is below a predetermined maximum current the electrical switch is kept closed; and
in a third configuration where the temperature of the battery is below the predetermined temperature but closing the electrical switch such that the battery is short circuited and heated via joule heating through its internal resistance results in the current flowing being above the predetermined maximum current the electrical switch is modulated to keep the current flowing below the predetermined maximum current.

9. The method according to claim 8, wherein
the battery is a secondary rechargeable battery.

10. The method according to claim 9, wherein
the secondary battery rechargeable battery is one of a lithium ion (Li-ion) battery, a Li-ion polymer battery, an aluminum ion (Al-ion) battery, a nickel-cadmium (NiCd) battery and a nickel-metal hydride (NiMH) battery.

11. The method according to claim 8, wherein
the battery is an assembly of secondary rechargeable batteries.

12. The method according to claim 11, wherein
each secondary battery rechargeable battery is at least one of a lithium ion (Li-ion) battery, a Li-ion polymer battery, an aluminum ion (Al-ion) battery, a nickel-cadmium (NiCd) battery and a nickel-metal hydride (NiMH) battery.

13. The method according to claim 8, further comprising,
providing a second electrical switch coupled to the battery, an electrical device powered by the battery, and the controller or control circuit; wherein
an electrical circuit is the electrical device;
in the first configuration where the temperature of the battery is above the predetermined temperature the second electrical switch is closed such that electrical device can draw current from the battery; and
in either of the second configuration and third configuration the second electrical switch is open.

14. The method according to claim 8, wherein
the electrical switch is a MOSFET.

15. A non-volatile non-transitory computer readable medium storing computer executable instructions for execution by a microprocessor, the instruction relating to a process comprising the steps of:
determining whether the temperature of a battery is above a predetermined setpoint temperature;
upon a positive determination with respect to the temperature opening an electrical switch forming part of an electrical circuit together with a current sensor disposed in series with the battery;
upon a negative determination with respect to the temperature closing the electrical switch such that the battery is short circuited via an external electrical circuit and heats via through joule heating through its internal resistance;
determining if the current flowing in the electrical circuit when the electrical switch is closed is below a predetermined maximum current;
upon a positive determination with respect to the current maintaining the electrical switch closed; and
upon a negative determination with respect to the current modulating the electrical switch to keep the current flowing below the predetermined maximum current.

16. The computer executable instructions according to claim 15, further comprising
upon a negative determination with respect to the current generating a pulse width modulated (PWM) signal for turning the electrical switch on and off; wherein
the duty cycle of the PWM signal varies either in a predetermined manner established in dependence upon the battery or in dependence upon the monitored temperature of the battery.

17. The computer executable instructions according to claim 16, wherein
determining whether the temperature of the battery is above a predetermined setpoint temperature is ongoing until a positive determination with respect to the temperature is made.

* * * * *